United States Patent
Koie

(10) Patent No.: US 7,885,570 B2
(45) Date of Patent: Feb. 8, 2011

(54) IMAGE FORMING APPARATUS HAVING A CLEANING UNIT THAT CLEANS A REGION OF THE IMAGE CARRIER

(75) Inventor: Hiroshi Koie, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 164 days.

(21) Appl. No.: 12/237,701

(22) Filed: Sep. 25, 2008

(65) Prior Publication Data

US 2009/0092407 A1      Apr. 9, 2009

(30) Foreign Application Priority Data

Oct. 2, 2007      (JP) .............................. 2007-258854

(51) Int. Cl.
  G03G 15/00      (2006.01)
  G03G 15/01      (2006.01)
(52) U.S. Cl. .............................. 399/71; 399/49; 399/301
(58) Field of Classification Search ................... 399/49, 399/71, 98, 99, 101, 301; 347/116
  See application file for complete search history.

(56) References Cited

U.S. PATENT DOCUMENTS

| | | | |
|---|---|---|---|
| 5,740,495 A | 4/1998 | Maher et al. | |
| 5,797,063 A | 8/1998 | Umezawa et al. | |
| 6,970,660 B2 * | 11/2005 | Harada et al. | 399/49 |
| 7,221,882 B2 * | 5/2007 | Nakagawa | 399/49 |
| 2004/0234309 A1 | 11/2004 | Nagata et al. | |
| 2007/0014583 A1 | 1/2007 | Saeki | |

FOREIGN PATENT DOCUMENTS

| | | |
|---|---|---|
| EP | 1473602 A1 | 3/2004 |
| JP | 5-61369 A1 | 3/1993 |
| JP | 10-319652 | 12/1998 |
| JP | 11-119478 A | 1/1999 |
| JP | 11-119478 A | 4/1999 |
| JP | 2000-147862 | 5/2000 |
| JP | 2002-6587 A | 1/2002 |
| JP | 2002-099119 | 4/2002 |
| JP | 2002-196548 A | 7/2002 |
| JP | 2002-244394 | 8/2002 |
| JP | 2003-098795 | 4/2003 |
| JP | 2004-184820 A | 7/2004 |
| JP | 2006-220845 A | 8/2006 |
| JP | 2007-156281 | 6/2007 |

OTHER PUBLICATIONS

Extended EP Search Report dtd Sep. 7, 2009, EP Appln. 08253126.0-1228.
JP Office Action dtd Sep. 8, 2009, JP Appln. 2007-258854, partial English translation.

* cited by examiner

Primary Examiner—Sandra L Brase
(74) Attorney, Agent, or Firm—Banner & Witcoff, Ltd.

(57) ABSTRACT

An image forming apparatus is provided. The image forming apparatus includes: a carrier; a forming unit which forms an image on a carrier; a cleaning unit which cleans the carrier; a detection unit which detects a correction pattern formed on the carrier; and a control unit which performs a correction processing including cleaning a pattern forming region in the carrier by the cleaning unit, forming the correction pattern in the pattern forming region by the forming unit after finishing the cleaning by the cleaning unit, and correcting an image forming characteristic of the forming unit based on a detection result of the correction pattern by the detection unit.

16 Claims, 7 Drawing Sheets

PATTERN FOR POSITION SHIFT CORRECTION

PATTERN FOR DENSITY CORRECTION

IMAGE FORMING APPARATUS HAVING A CLEANING UNIT THAT CLEANS A REGION OF THE IMAGE CARRIER

CROSS-REFERENCE TO RELATED APPLICATION

This application claims priority from Japanese Patent Application No. 2007-258854, filed on Oct. 2, 2007, the entire subject matter of which is incorporated herein by reference.

TECHNICAL FIELD

Aspects of the present invention relate to an image forming apparatus.

BACKGROUND

An image forming apparatus, such as a color laser printer, includes a plurality of image forming units arranged along a sheet conveying belt. In the image forming apparatus, toner images of respective colors are transferred onto the sheet to be conveyed on the belt from the respective image forming units. In such an image forming apparatus, if a transfer position shift (color shift) between the image forming units with respect to the sheet occurs, the quality of an image to be formed is deteriorated.

To ensure the quality of the image, there is suggested a technique, called registration, which corrects the shift of a forming position in each color (for example, JP-A-2003-98795). According to this technique, a predetermined pattern is formed on the surface of the belt by each image forming unit, and the position of the pattern is detected by an optical sensor. Then, the forming position in each color is corrected on the basis of the detection result. Similarly, a technique is suggested that a pattern for density correction is formed on the belt, and the pattern is detected by an optical sensor. Then, the density of an image is corrected on the basis of the detection result.

During the above-described position shift correction or density correction, if toner is attached to and contaminates the surface of the belt, pattern detection can not be accurately performed. For this reason, an image forming apparatus is provided with a cleaning device for cleaning the belt. Then, after correction processing ends, the cleaning device removes toner attached to the surface of the belt.

In a related-art image forming apparatus, however, the belt may not be cleaned immediately before correction is performed. That is, even if the belt is cleaned after correction ends, an image forming unit may be detached or attached later, and as a result, the surface of the belt may be contaminated. In this state, if subsequent correction is performed, pattern detection accuracy may be degraded and the quality of the image to be formed may be deteriorated.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image forming apparatus which can ensure pattern detection accuracy during correction.

According to an exemplary embodiment of the present invention, there is provided an image forming apparatus including: a carrier; a forming unit which forms an image on a carrier; a cleaning unit which cleans the carrier; a detection unit which detects a correction pattern formed on the carrier; and a control unit which performs a correction processing including cleaning a pattern forming region in the carrier by the cleaning unit, forming the correction pattern in the pattern forming region by the forming unit after finishing the cleaning by the cleaning unit, and correcting an image forming characteristic of the forming unit based on a detection result of the correction pattern by the detection unit.

According to another exemplary embodiment of the present invention, there is provided a device for determining a contamination degree of a carrier rotatable in a rotating direction. The device includes: a cleaning unit provided around the carrier to clean the carrier; a detection unit which detects an amount of reflected light from the carrier at a upstream of the cleaning unit in the rotating direction; and a determination unit which determines the contamination degree of the carrier at a downstream of the cleaning unit in the rotating direction based on a detection result of the detection unit and a cleaning capability of the cleaning unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary Embodiment

An exemplary embodiment of the invention will now be described with reference to FIGS. 1 to 7.

(Overall Configuration of Printer)

Figure 1:
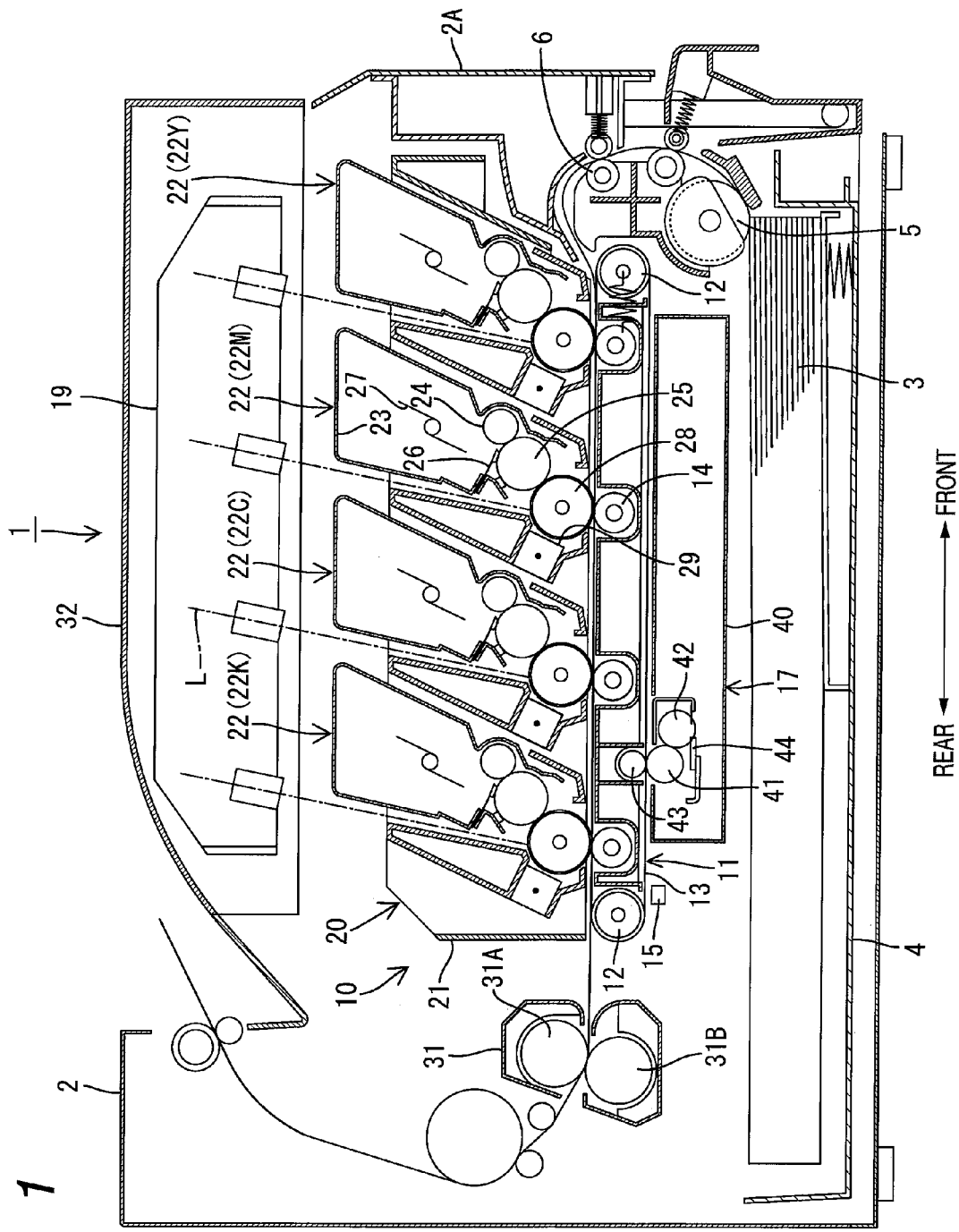
FIG. 1 is a sectional side view illustrating the schematic configuration of a printer according to an exemplary embodiment of the present invention.

FIG. 1 is a sectional side view illustrating the schematic configuration of a printer 1 according to an exemplary embodiment of the present invention. In the following description, the right side of FIG. 1 is taken as a front side and the left side is taken as a rear side.

The printer 1 includes a main body casing 2. In the bottom portion of the main body casing 2, a sheet feeding tray 4 is provided in which sheets 3 as recording mediums are stacked. Above the front end of the sheet feeding tray 4, a sheet feed roller 5 is provided. While the sheet feed roller 5 rotates, a sheet 3 at the uppermost position in the sheet feeding tray 4 is fed to a registration roller 6. The registration roller 6 aligns the sheet 3 and then conveys the sheet 3 onto a belt unit 11 of an image forming unit 10.

The image forming unit 10 includes a belt unit 11, a scanner unit 19, a process unit 20, and a fixing unit 31.

The belt unit 11 includes a belt 13 which is made of polycarbonate or the like and is wound around a pair of front and rear belt support rollers 12. Then, if the rear belt support roller 12 is rotated, the belt 13 is rotated counterclockwise (in a rotating direction) in FIG. 1, and the sheet 3 on the upper surface of the belt 13 is conveyed to the rear side. In the belt 13, transfer rollers 14 are provided to face respective photosensitive drums 28 of the process unit 20 described below with the belt 13 interposed therebetween.

The scanner unit 19 emits laser light of each color from a laser light emitting unit (not shown) onto the surface of the corresponding photosensitive drum 28.

The process unit 20 includes a frame 21 and developing cartridges 22 (22Y, 22M, 22C, and 22K) for four colors (yellow, magenta, cyan, and black), which are detachably mounted on four cartridge mounting portions provided in the frame 21. The process unit 20 can be pulled out forward when a front cover 2A provided at the front surface of the main body casing 2 is opened. When the process unit 20 is detached from the main body casing 2, the belt unit 11 or the cleaning device 17 can be attached to or detached from the main body casing 2. In the lower portion of the frame 21, a photosensitive drum 28 and a scorotron type charger 29 are provided to correspond to each developing cartridge 22. The surface of the photosensitive drum 28 is covered with a positively chargeable photosensitive layer.

Each developing cartridge 22 includes a toner containing chamber 23 that contains toner of corresponding color as developer in the upper portion in a boxlike casing, and also includes, below the toner containing chamber 23, a supply roller 24, a developing roller 25, a layer thickness regulating blade 26, and an agitator 27. Toner discharged from the toner containing chamber 23 is supplied to the developing roller by rotation of the supply roller 24, and is positively charged by friction between the supply roller 24 and the developing roller 25. Toner supplied to the developing roller 25 enters between the layer thickness regulating blade 26 and the developing roller 25 by rotation of the developing roller 25 and is further frictionally charged there. Then, toner is carried on the developing roller 25 as a thin layer having a constant thickness.

During image forming, the photosensitive drum 28 is rotated, and accordingly the surface of the photosensitive drum 28 is charged uniformly by the charger 29. Then, a positively charged portion is exposed by high-speed scanning of laser light from the scanner unit 19. In this way, an electrostatic latent image corresponding to an image to be formed on the sheet 3 is formed on the surface of the photosensitive drum 28.

Next, by rotation of the developing roller 25, toner which is carried on the developing roller 25 and positively charged is supplied to the electrostatic latent image formed on the surface of the photosensitive drum 28 when coming into contact with the photosensitive drum 28. Accordingly, the electrostatic latent image on the photosensitive drum 28 becomes a visible image, that is, a toner image formed by toner adhered thereto is carried on only the exposed portion of the surface of the photosensitive drum 28.

Thereafter, the toner images carried on the surfaces of the respective photosensitive drums 28 are successively transferred onto the sheet 3 by a negative-polarity transfer bias applied to the transfer rollers 14 while the sheet 3 which is conveyed by the belt 13 passes through respective transfer positions between the photosensitive drums 28 and the transfer rollers 14. Next, the sheet 3 onto which the toner images are transferred in such a manner is conveyed to the fixing unit 31.

The fixing unit 31 includes a heating roller 31A having a heat source and a pressing roller 31B that presses the sheet 3 against the heating roller 31A. In the fixing unit 31, the toner images transferred onto the sheet 3 are thermally fixed. Then, the sheet 3 onto which the toner images are thermally fixed by the fixing unit 31 is conveyed upward and discharged onto a sheet discharging tray 32 provided at the upper surface of the main body casing 2.

(Cleaning Device)

The cleaning device 17 includes a case 40 for containing toner collected from the surface of the belt 13 or sheet dust. In the upper portion of the case 40, a cleaning roller 41 and a collecting roller 42 are provided to be pressed into contact with each other. The cleaning roller 41 faces a metallic backup roller 43 provided in the belt unit 11 with the belt 13 interposed therebetween. A scraping blade 44 made of rubber is pressed into contact with the collecting roller 42 from below.

The entire cleaning device 17 is displaceable up and down by a displacement mechanism (not shown). When power is turned on under the control of a central processing unit (CPU) 50 described below, the cleaning device 17 is displaced to a position in which the cleaning roller 41 comes into contact with the belt 13. Then, the cleaning roller 41 is driven in a direction opposite to the moving direction of the belt 13 by a driving force from a main motor 57 (see FIG. 2) provided in the main body casing 2, and a predetermined bias is applied between the cleaning roller 41 and the backup roller 43. Accordingly, toner attached onto the belt 13 is physically scraped off and electrically attracted toward the cleaning roller 41. When power is turned off, the cleaning device 17 is descended to a position in which the cleaning roller 41 is not in contact with the belt 13, and the bias between the cleaning roller 41 and the backup roller 43 is turned off.

(Electrical Configuration of Printer)

Figure 2:
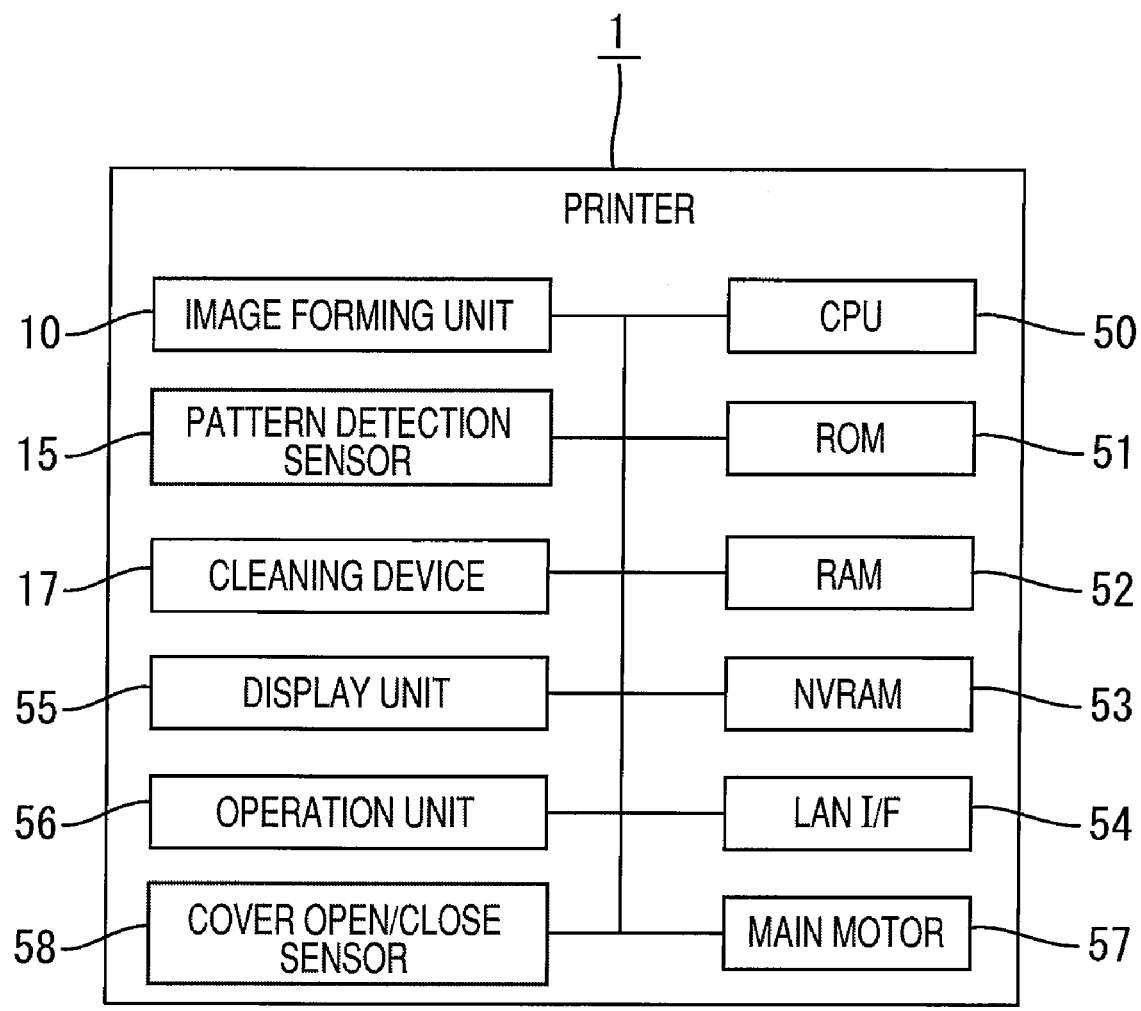
FIG. 2 is a block diagram schematically illustrating the electrical configuration of the printer shown in FIG. 1.

FIG. 2 is a block diagram schematically illustrating the electrical configuration of the printer 1. As shown in the drawing, the printer 1 includes the CPU 50 (an example of a detection unit, a control unit, a determination unit, and an invalidation unit), a read only memory (ROM) 51, a random access memory (RAM) 52, an non-volatile random access memory (NVRAM) 53, and a network interface 54. To these, the image forming unit 10, the pattern detection sensors 15, and the cleaning device 17 described above, a display unit 55, an operation unit 56, a main motor 57, a cover open/close sensor 58, and the like are connected.

The ROM 51 stores programs for executing various operations of the printer 1, such as a contamination level detection processing or a correction processing described below. The CPU 50 controls the individual units according to the programs read out from the ROM 51 while storing the processing results in the RAM 52 or the NVRAM 53. The network interface 54 is connected with an external computer or the like through a communication line (not shown) and enables mutual data communication.

The display unit 55 includes a liquid crystal display or a lamp and can display various setup screens and operations states of the printer. The operation unit 56 includes a plurality of buttons. A user can perform various input operations through the operation unit 56.

The main motor 57 rotates the registration roller 6, the belt support rollers 12, the transfer rollers 14, the developing rollers 25, the photosensitive drums 28, the heating roller 31A, the cleaning roller 41, and the like in synchronization with one another. The cover open/close sensor 58 detects the open/close state of the front cover 2A.

(Contamination Degree Detection Processing)

Figure 3:
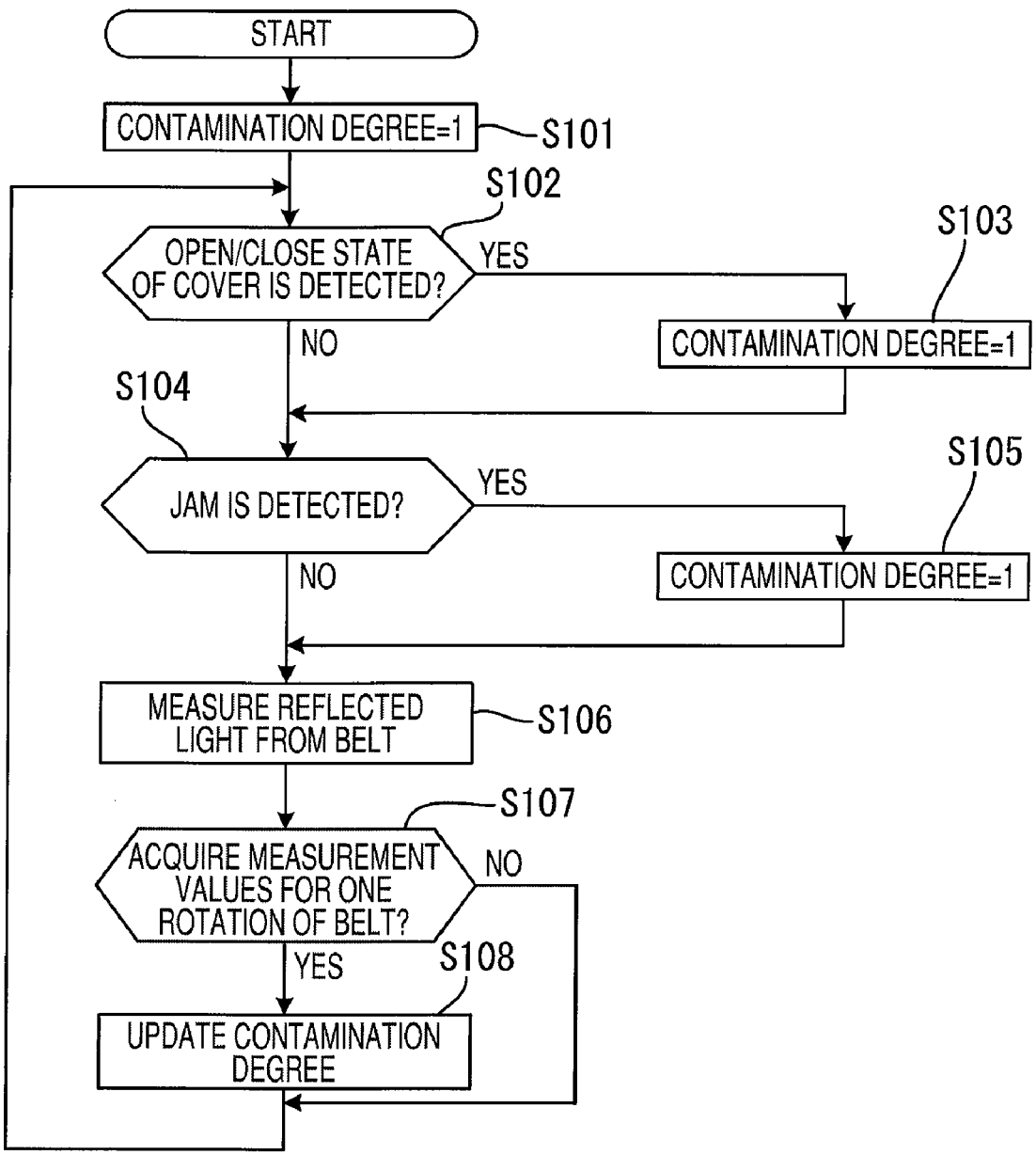
FIG. 3 is a flowchart illustrating the flow of a contamination degree detection processing.

Next, a contamination degree detection processing for detecting a contamination degree of the belt 13 will be described. FIG. 3 is a flowchart illustrating the flow of a contamination degree detection processing.

The contamination degree detection processing is constantly performed as a background operation under the control of the CPU 50 after the printer 1 is powered on. The contamination degree detection processing determines a contamination degree to be stored in the RAM 52. The contamination degree is a value indicative of a contamination degree of the surface of the belt 13 within a range of 0 to 1. The value "1" indicates a most contaminated state, and the value "0" indicates a cleanest state.

If the contamination degree detection processing is started, the CPU 50 first sets the contamination degree to "1" at operation S101. Then, it is examined whether the open/close operation of the front cover 2A is detected by the cover open/close sensor 58 at operation S102. When the open/close operation of the front cover 2A is detected (S102: Yes), the contamination degree is set to "1" at operation S103. If the contamination degree is "1" before the operation S103 or if the open/close operation of the front cover 2A is not detected (S102: No), the contamination degree remains unchanged.

Subsequently, the CPU 50 examines whether jam (sheet clogging) occurs at operation S104. A plurality of sheet sensors (not shown) is provided on the conveying path of the sheet 3. If the sheet 3 is not detected by the sheet sensors at a predetermined timing while the sheet 3 is conveyed, the CPU 50 determines that a jam occurs. If a jam occurs (S104: Yes), the CPU 50 sets the contamination degree to "1" at operation S105. Here, if the contamination degree is "1" before the operation S105 or if a jam does not occur (S104: No), the contamination degree remains unchanged.

Next, the CPU 50 measures the amount of reflected light from the belt 13 by the pattern detection sensors 15, and stores the measurement value in the RAM 52 at operation S106. The measurement value is accumulated in the RAM 52 each time measurement is performed. However, if the contamination degree is set to "1" in the operations S103 and S105, all the measurement values are cleared from the RAM 52. Then, the CPU 50 determines whether the measurement values are obtained by the number corresponding to one rotation of the belt 13 at operation S107. If the number of obtained measurement values does not correspond to one rotation (S170: No), the operation S102 and later operations are repeated at a predetermined interval.

If the measurement values are obtained by the number corresponding to one rotation of the belt 13 (S107: Yes), the CPU 50 calculates the contamination degree (that is, a value ranging from 0 to 1) corresponding to the highest value among the measurement values (corresponding to a most contaminated place among the measurement places on the belt 13). Then, the calculated value is written into the RAM 52 as a new contamination degree at operation S108, and clears the measurement values stored in the RAM 52. Thereafter, the process returns to the operation S102, and the same processing is repeated.

As described above, in the contamination degree detection processing, the amount of reflected light from the belt 13 is measured at a predetermined interval, and on the basis of the measurement value, the contamination degree (contamination information) of the belt 13 is determined and stored in the RAM 52. Then, if an operation which can change the contamination state of the belt 13 is detected, for example, the front cover 2A is opened or closed, or jam occurs, the contamination degree is overwritten (invalidated).

(Correction Processing)

Figure 4:
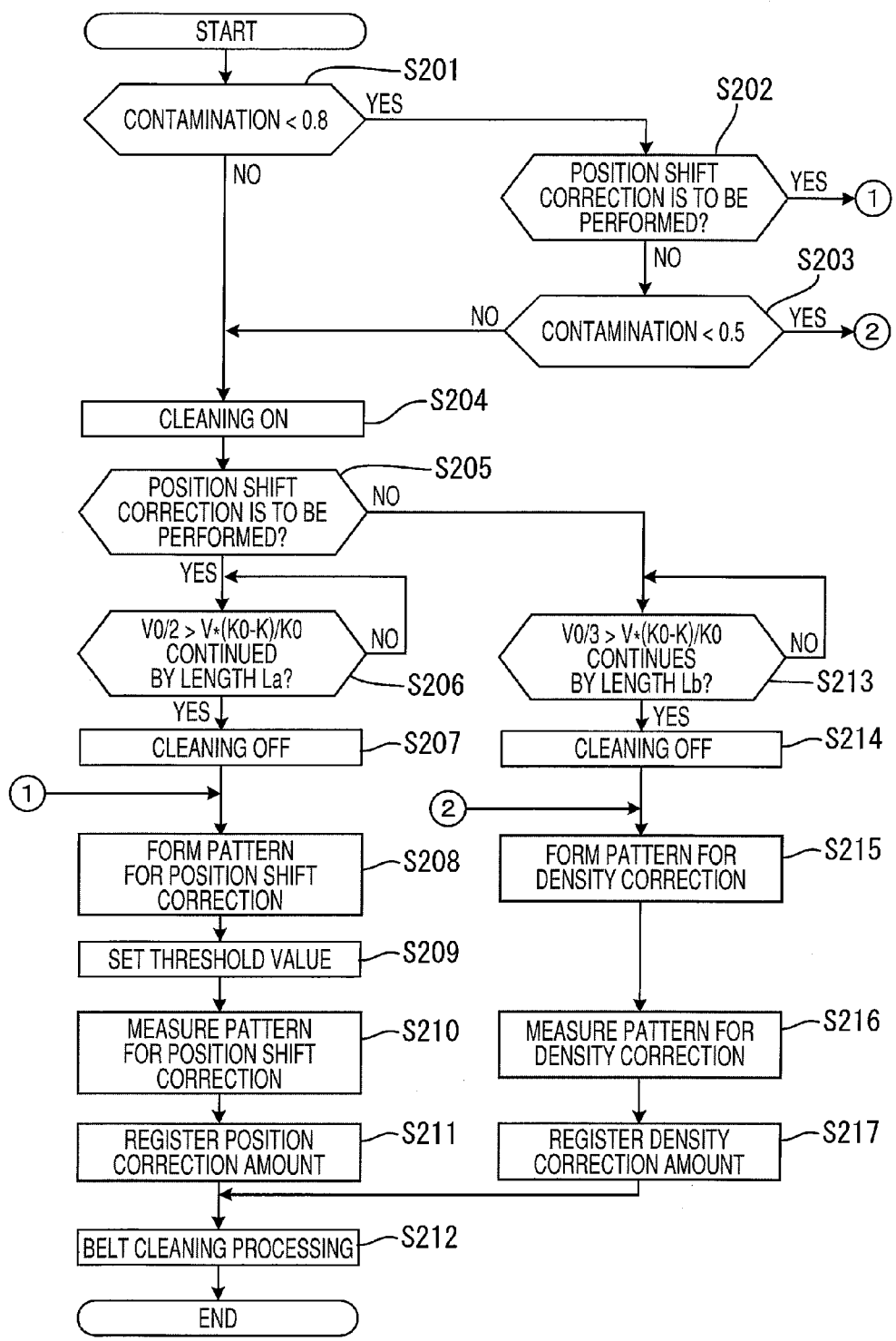
FIG. 4 is a flowchart illustrating the flow of a correction processing.

FIG. 4 is a flowchart illustrating the flow of a correction processing.

When a predetermined condition is satisfied, for example, the front cover 2A is opened or closed, or the number of printed sheets reaches a predetermined value or the elapsed time reaches a predetermined value from the previous correction processing, the CPU 50 starts the correction processing to perform one of position shift correction and density correction.

If the correction processing is started, the CPU 50 refers to the contamination degree stored in the RAM 52 by the above contamination degree detection processing, and determines whether the value is smaller than 0.8 at operation S201. Here, the contamination degree of 0.8 is a reference value for determining whether a pattern P1 for the position shift correction formed on the belt 13 can be accurately detected when the position shift correction is performed as described below.

If the contamination degree is smaller than 0.8 (that is, the contamination degree of the belt 13 bears the criteria for performing the position shift correction) (S201: Yes), during the correction processing, it is determined whether the position shift correction is to be performed at operation S202. Then, if it is determined that the position shift correction is to be performed (S202: Yes), the process proceeds to operation S208 described below, and the pattern P1 for position shift correction starts to be formed at operation S208.

If it is determined that the density correction is to be performed (S202: No), it is determined whether the contamination degree of the belt 13 is smaller than 0.5 at operation S203. Here, the contamination degree of 0.5 is a reference value for determining whether a density can be accurately measured with a pattern P2 for density correction formed on the belt 13 if the density correction described below is performed. That is, in case of the density correction, the reference of the contamination degree needs to be lower than that for position shift correction, and the belt 13 needs to be cleaner. If the contamination degree is smaller than 0.5 (that is, the contamination degree of the belt 13 bears the criteria for the density correction) (S203: Yes), the process proceeds to operation S215 described below, and the pattern for density correction starts to be formed at operation S215.

If the contamination degree of the belt 13 is not less than 0.8 (S201: No), or if the density correction is to be performed and the contamination degree is not less than 0.5 (S203: No), the CPU 50 turns on and starts to operate the cleaning device 17 at operation S204. Accordingly, the cleaning roller 41 comes into contact with the belt 13, and according to the movement of the belt 13, a portion facing the cleaning roller 41 on the surface of the belt 13 is cleaned.

Subsequently, the CPU 50 determines whether the position shift correction is to be performed at operation S205. If the position shift correction is to be performed (S205: Yes), the CPU 50 waits until a time period in which an output level V of each pattern detection sensor 15 satisfies Equation 1 continues a time period corresponding to a length La of the belt 13 (described below) while cleaning the belt 13 by using the cleaning device 17 at operation S206.

$$V0/2 > V*(K0-K)/K0 \qquad \text{[Equation 1]}$$

K0: expected maximum thickness of a toner layer on the belt 13

K: cleaning capability of the cleaning device 17, that is, the thickness of a toner layer to be removed when the belt 13 passes through the cleaning device 17 once V: output level of the pattern detection sensor 15

V0: expected maximum value of an output level of the pattern detection sensor 15 (that is, an output level when a portion of a toner layer having a maximum thickness is measured)

In Equation 1, "K0−K" corresponds to the maximum thickness of the toner layer on the surface of the belt 13 on a downstream side from the cleaning device 17, which is after being cleaned by the cleaning device 17. On the right side of Equation 1, "V*(K0−K)/K0" corresponds to an output level when it is supposed that reflected light is measured by the pattern detection sensor 15 on the downstream side from the cleaning device 17, which is an output level obtained by subtracting the amount to be cleaned by the cleaning device 17.

The left side of Equation 1 is a threshold value for determining the contamination degree of the belt 13. This value is half of the maximum output level of the pattern detection sensor 15, and is an intermediate value between an output level V0 when the amount of reflected light from the pattern surface is measured and an output level when the amount of reflected light from the surface of the belt 13 is measured. Then, if the value of the right side is less than the value of the left side, Equation 1 is satisfied. If Equation 1 is satisfied, the contamination degree at a portion on the belt 13 measured by the pattern detection sensor 15 becomes lower than a reference value.

Figure 5:
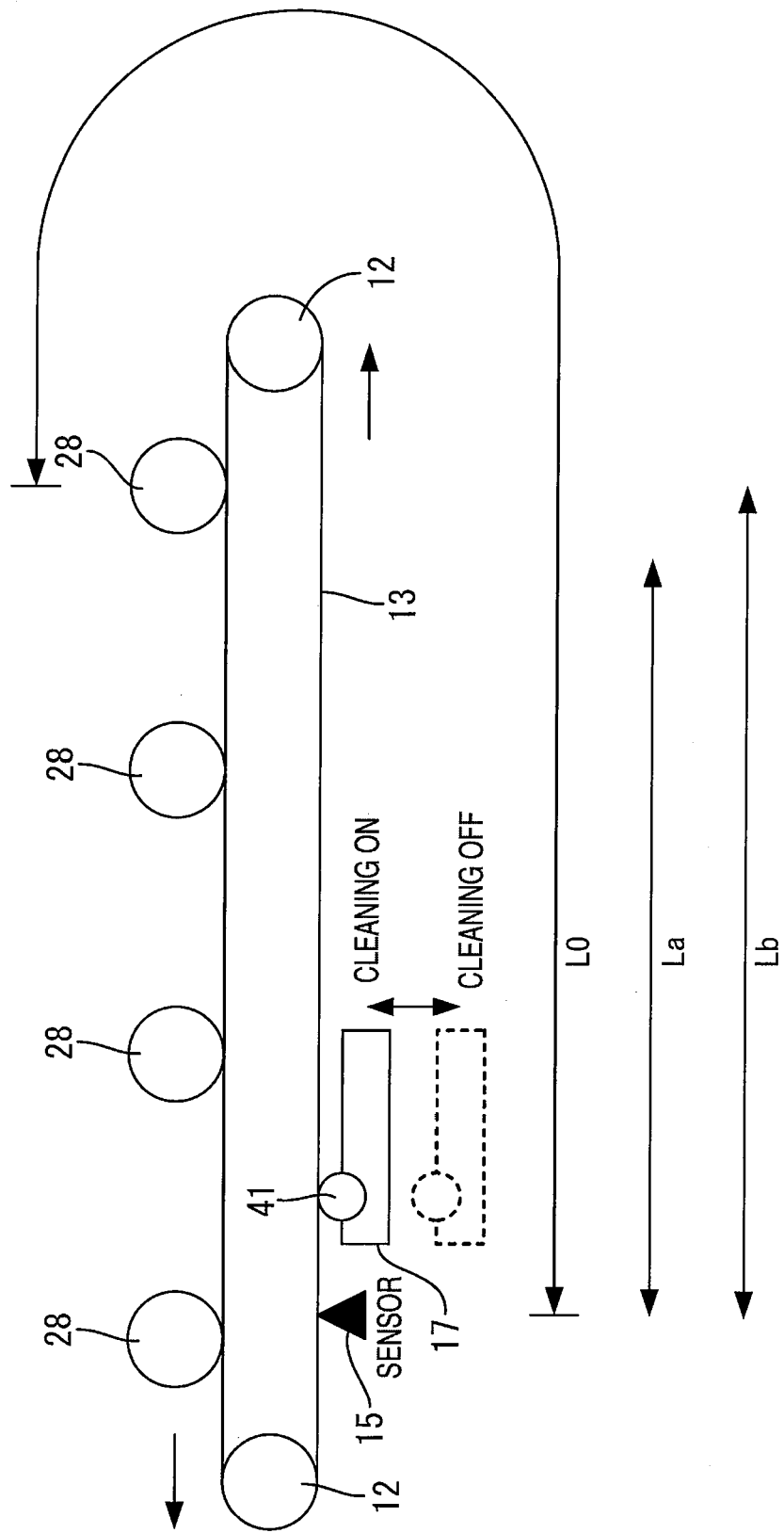
FIG. 5 is a diagram illustrating the position relationship between a belt, and a pattern detection sensor, a cleaning device, and a photosensitive drum provided around the belt.
Figure 6:
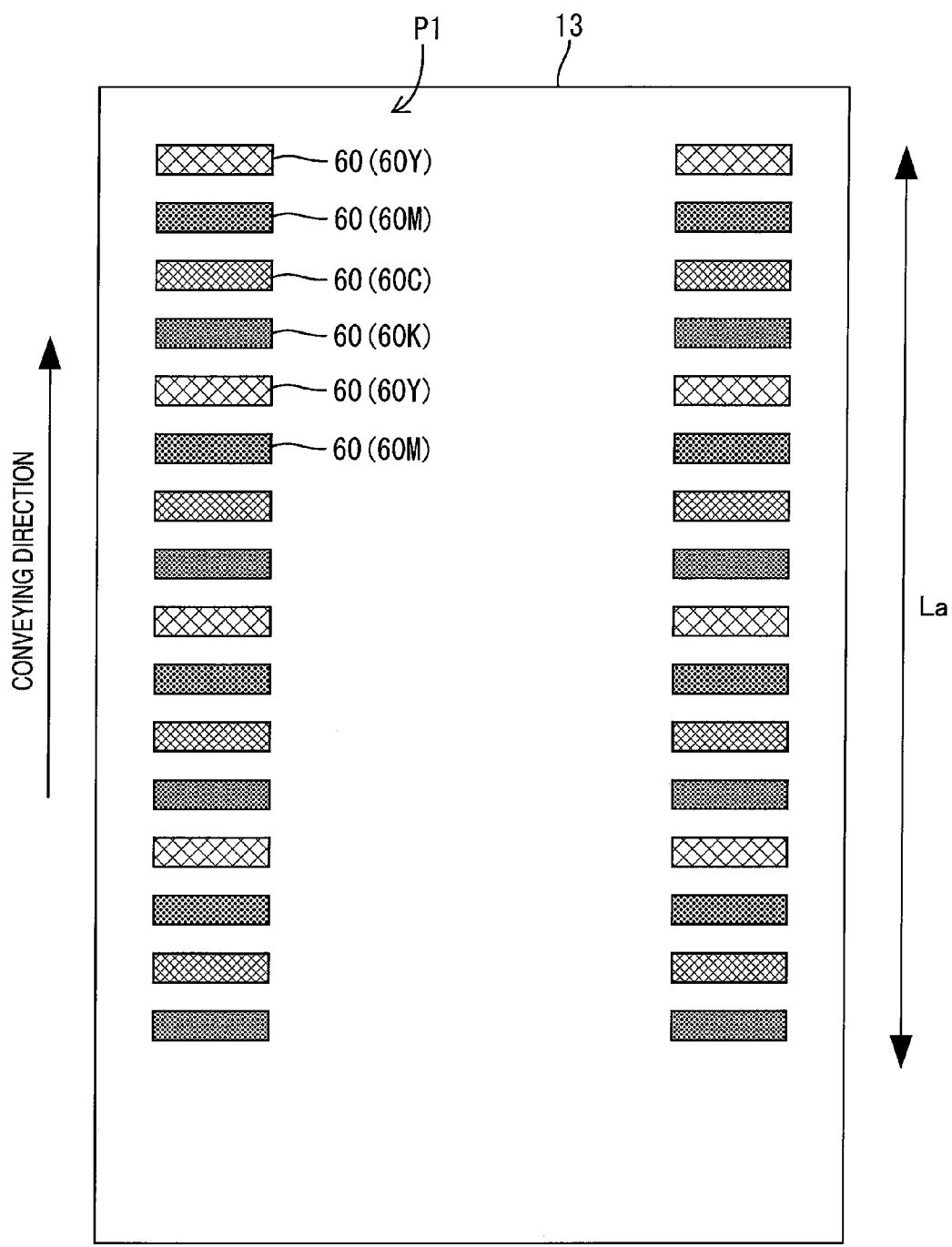
FIG. 6 is a diagram illustrating a pattern for position shift correction.
Figure 7:
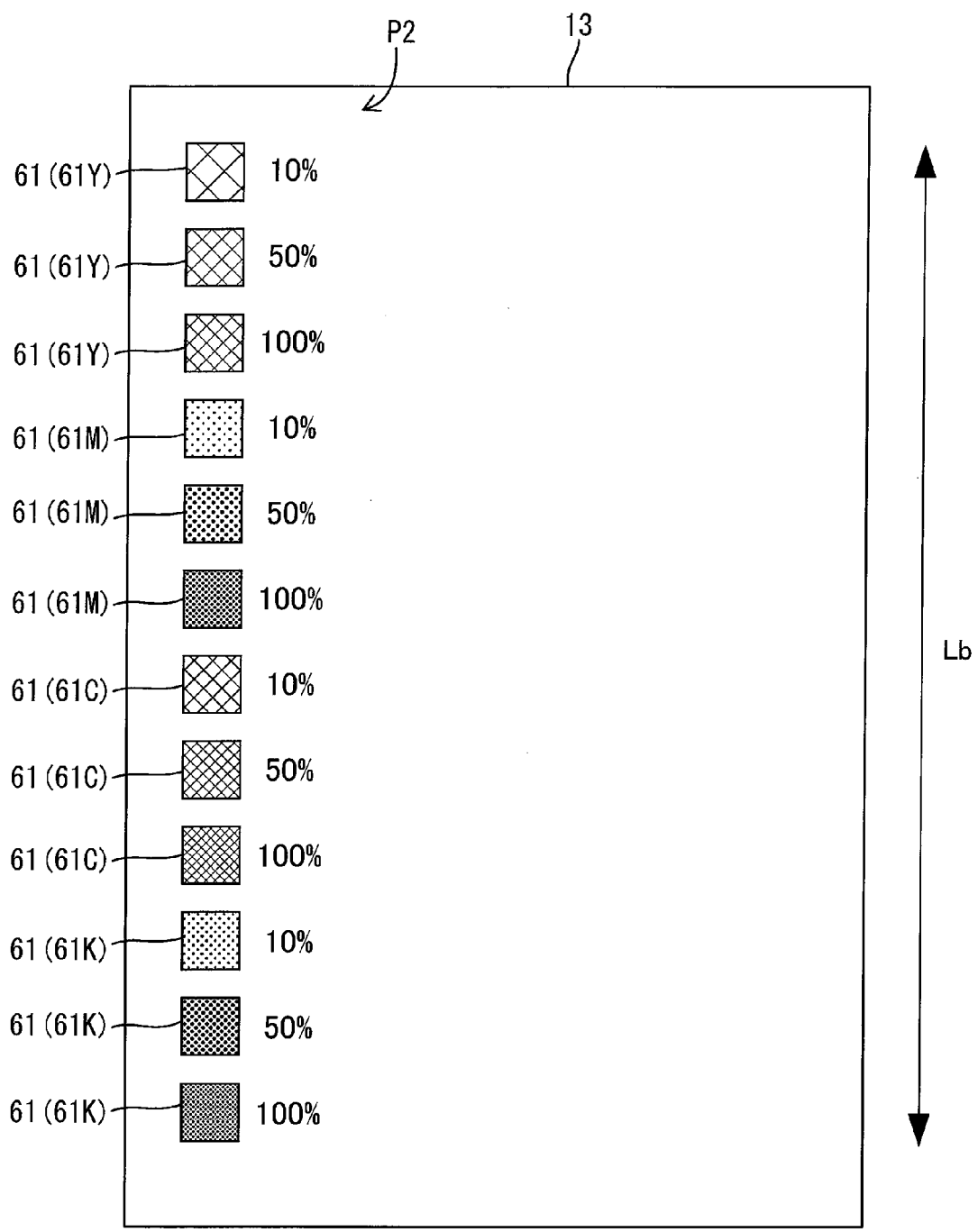
FIG. 7 is a diagram illustrating a pattern for density correction.

FIG. 5 is a diagram illustrating the position relationship between the belt 13, and the pattern detection sensors 15, the cleaning device 17 and the photosensitive drums 28 provided around the belt 13. FIG. 6 illustrates an example of a pattern for position shift correction. FIG. 7 illustrates an example of a pattern for density correction.

As shown in FIG. 6, the pattern P1 for position shift correction has a plurality of marks 60 which are arranged in two lines on left and right sides of the surface of the belt 13 at predetermined intervals. A pair of pattern detection sensors 15 are arranged to face the marks 60 of the left and right columns, respectively. The marks 60 correspond to the colors of toner used in the process unit 20, and a plurality of sets of marks 60, each set having four marks of yellow (60Y), magenta (60M), cyan (60C), and black (60K), are arranged in a predetermined order along the sheet conveying direction. A length on the belt 13 in which the pattern P1 for position shift correction is formed is La. As shown in FIG. 5, the length La is smaller than a length L0 on the belt 13 from the pattern detection sensor 15 to the initial image forming position (a position facing the photosensitive drum 28 of yellow).

Meanwhile, as shown in FIG. 7, the pattern P2 for density correction has a plurality of marks 61 which are arranged in a line on one side of the surface of the belt 13. The pattern P2 for density correction has a plurality of marks 61 which have different densities for the respective colors (yellow (61Y), magenta (61M), cyan (61C), and black (61K)) of toner used in the process unit 20, for example, 10%, 50%, and 100%. A length on the belt 13 in which the pattern P2 for density correction is formed is Lb. As shown in FIG. 5, the length Lb is smaller than the length L0 on the belt 13 from the pattern detection sensor 15 to the initial image forming position.

In operation S206, if the state satisfying Equation 1 is kept until the belt 13 passes through the position of the pattern detection sensor 15 by the length La (S206: Yes), the CPU 50 sets the region on the belt 13 corresponding to the length La as a pattern forming region where the pattern P1 for position shift correction is to be formed. Then, after the rear end of the pattern forming region passes through the cleaning device 17, the cleaning device 17 is turned off at operation S207. Accordingly, if the contamination degree of the belt 13 is large (does not bear the criteria of Equation 1), the operation amount of the cleaning device 17 (the number of times of cleaning the same place on the belt 13, a cleaning range, an operation time, and the like) is increased.

Subsequently, if the front end of the pattern forming region on the belt 13 is moved from the position of the pattern detection sensor 15 by the length L0, that is, reaches the initial image forming position, the CPU 50 starts to form the pattern P1 for position shift correction at a timing at which an initial yellow mark 60Y is transferred from the photosensitive drum 28 at operation S208. As described above, when the position shift correction is to be performed, if the contamination degree of the belt 13 is smaller than the reference of 0.8 (S202: Yes), the pattern P1 for position shift correction immediately starts to be formed in S208 without operating the cleaning device 17.

Subsequently, the CPU 50 sets a threshold value Vt which is used to measure the position of the pattern P1 for position shift correction at operation S209. This threshold value Vt is determined, for example, by using Equation 2.

$$Vt = (Vm - V0/2) * 1.2, \text{ if } (Vm - V0/2)/V0 \geq 0.3$$

$$Vt = V0 * 0.3, \text{ if } (Vm - V0/2)/V0 < 0.3 \quad \text{[Equation 2]}$$

Vm: maximum value of a measured output value V of the pattern detection sensor 15

On the belt 13, a place where the output level Vm of the pattern detection sensor 15 is slightly large, and the contamination degree is comparatively large is cleaned while passing through the cleaning device 17. Then, if it is supposed that reflected light was measured by using the pattern detection sensor 15, it is considered that the output is decreased by at least V0/2. Accordingly, "Vm−V0/2" of Equation 2 corresponds to the maximum output level on the downstream side from the cleaning device 17 if the amount of reflected light from the surface of the belt 13 is measured by using the pattern detection sensor 15. In Equation 2, when a value obtained by dividing "Vm−V0/2" by V0 is not less than 0.3, the value is multiplied by 1.2 and then the calculated value is set as the threshold value Vt. Accordingly, the threshold value Vt is set as the intermediate value between the output level when the amount of reflected light from the surface of the belt is measured and the output level V0 when the amount of reflected light from the mark 60 is measured. The larger the amount of reflected light from the surface of the belt is, the larger the threshold value is. When the value obtained by dividing "Vm−V0/2" by V0 is less than 0.3, the threshold value Vt is set to be 0.3 times V0 (lower value).

Subsequently, when the pattern forming region where the pattern P1 for position shift correction is formed reaches the position of the pattern detection sensor 15, the CPU 50 starts to measure the position of the pattern P1 for position shift correction (S210). The CPU 50 compares the output V from the pattern detection sensor 15 with the threshold value Vt. Then, if the output V is larger than the threshold value Vt, that is, if the amount of reflected light from the belt 13 is close to the amount V0 of reflected light from the surface of the pattern, the CPU 50 determines that a mark 60 exists at a position facing the pattern detection sensor 15. On the other hand, if the output V is smaller than the threshold value Vt, that is, if it is close to the amount of reflected light from the surface of the belt 13, the CPU 50 determines that no mark 60 exists on the belt 13.

The CPU 50 calculates a shift amount of the image forming position of each color with respect to black on the basis of the measurement result of each mark 60, and registers a position correction amount corresponding to the shift amount in the NVRAM 53 at operation S211. During image forming, when exposure is performed by the scanner unit 19, the write position of each photosensitive drum 28 is corrected on the basis of the position correction amount.

After the position shift correction ends through operations S208 to S211, the CPU 50 turns on the cleaning device 17 to perform a cleaning processing of the belt 13 at operation S212. During the cleaning processing, the amount of reflected light from the belt 13 is measured by using the pattern detection sensor 15. Then, cleaning of the belt 13 is continued until the output level of the pattern detection sensor 15 is less than the threshold value over the entire belt 13, and the pattern P1 for position shift correction is removed.

In operation S205, when density correction is to be performed (S205: No), the CPU 50 waits until a time period in which the output of the pattern detection sensor 15 satisfies Equation 3 continues by a time period corresponding to the length Lb of the belt 13 while cleaning the belt 13 by using the cleaning device 17 at operation S213.

$$V0/3 > V^*(K0-K)/K0 \quad \text{[Equation 3]}$$

Equation 3 is different from Equation 1 in that the value of the left side is V0/3. That is, on the downstream side from the cleaning device 17, if the maximum output level when it is supposed that reflected light is measured by using the pattern detection sensor 15 is less than 1/3 of the maximum output level of the pattern detection sensor 15, Equation 3 is satisfied. In Equation 3, the value of the left side for determining the contamination degree of the belt 13 becomes smaller than that in Equation 1. That is, in case of density correction, the belt 13 needs to be cleaner than in case of position shift correction.

If the state satisfying Equation 3 continues until the belt 13 passes through the position of the pattern detection sensor 15 by the length Lb (S213: Yes), the CPU 50 sets the region on the belt 13 corresponding to the length Lb as a pattern forming region in which the pattern P2 for density correction is to be formed. Then, after the rear end of the pattern forming region passes through the cleaning device 17, the cleaning device 17 is turned off at operation S214. When density correction is to be performed, the condition represented by Equation 3 is stricter than in case of position shift correction. Therefore, the operation amount of the cleaning device 17 is increased according to the contamination degree of the belt 13, as compared with position shift correction.

Subsequently, when the front end of the pattern forming region on the belt 13 is moved from the position of the pattern detection sensor 15 by the length L0, that is, reaches the initial image forming position, the CPU 50 starts to form the pattern P2 for density correction at a timing at which an initial mark 61 is transferred from the photosensitive drum 28 at operation S215. As described above, when density correction is to be performed, if the contamination degree of the belt 13 is less than the reference of 0.5 (S203: Yes), the CPU 50 immediately starts to form the pattern P2 for density correction at operation S215 without operating the cleaning device 17.

Subsequently, if the pattern forming region reaches the position of the pattern detection sensor 15, the CPU 50 starts to measure the pattern P2 for density correction at operation S216. Here, the CPU 50 measures the densities of the respective marks 61, and registers a density correction value based on the measurement results in the NVRAM 53 at operation S217. During image forming, the densities of the respective colors when exposure is performed by the scanner unit 19 are corrected on the basis of the density correction amount.

After the density correction through operations S213 to S217 ends, the CPU 50 turns on the cleaning device 17 to clean the belt 13 at operation S212. During the cleaning processing, the amount of reflected light from the belt 13 is measured by using the pattern detection sensor 15. The belt 13 is continuously cleaned until the output level of the pattern detection sensor 15 is not more than a predetermined threshold value over the entire belt 13, and the pattern P2 for density correction is removed. In this way, the correction processing ends.

Advantage of the Exemplary Embodiment

As described above, according to this exemplary embodiment, if the correction processing is to be performed, first, the belt 13 is cleaned, then the pattern is formed in a cleaned portion on the belt 13, and subsequently pattern detection and correction are performed. With this configuration, the belt 13 is cleaned before the pattern is formed. Therefore, it is possible to ensure pattern detection accuracy and to increase correction accuracy, thereby ensuring the quality of an image to be formed.

The operation amount during cleaning by the cleaning device 17 can be changed. Therefore, the operation amount can be changed as occasion demands. For example, when the belt 13 is not contaminated so much, the operation amount is set to be small, and as a result, a waiting time of the user can be reduced.

During density correction, pattern detection tends to be affected by contamination of the belt 13, compared with position shift correction. For this reason, during density correction, the operation mount of the cleaning device 17 is set to be large, compared with position shift correction, thereby ensuring the pattern detection accuracy. During position shift correction, the operation amount of the cleaning device 17 is set to be small, compared with density correction, thereby reducing a processing time.

The contamination degree of the belt 13 is determined, and the operation amount during cleaning is changed according to the contamination degree. Therefore, appropriate cleaning can be performed.

The amount of reflected light from the belt 13 is measured, and the contamination degree is determined on the basis of the measurement result. Therefore, the contamination degree can be accurately determined, as compared with a case where the contamination degree is estimated according to the number of printed sheets.

Comparison is performed to determine whether the light to be measured is close to the amount of reflected light from the surface of the belt 13 or the amount of reflected light from the surface of the pattern. Therefore, the contamination degree can be appropriately determined.

When a place on the belt 13 measured by the pattern detection sensor 15 is arranged to reach the image forming position of the image forming unit while passing through the cleaning device 17, the contamination degree is determined by subtracting the amount to be cleaned by the cleaning device 17 from the measurement result. For this reason, as compared with a case where the contamination degree is determined on the basis of the measurement result, an actual contamination degree can be promptly determined, and a pattern can start to be formed.

The amount of reflected light from the belt 13 is measured at a predetermined interval, and the contamination information based on the measurement result is stored, and when correction is performed, the contamination degree is determined on the basis of the contamination information. Therefore, the contamination degree can be determined in a short time, as compared with a case where measurement is not started until correction is performed.

Further, for example, when a contamination state of the belt 13 is changed, the contamination information is invalidated. Therefore, appropriate determination can be performed.

When it is determined that the contamination degree of the belt 13 is less than the reference, the operation amount of the cleaning device 17 is set to 0. Therefore, an unnecessary cleaning processing is not performed, and as a result, a processing time can be reduced.

Since the amount of reflected light from the surface of the belt 13 is changed due to a wear pattern on the surface of the belt 13, by changing the threshold value for position detection according to the amount of light, pattern detection accuracy can be increased.

Other Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims.

(1) During the correction processing, it may be configured such that, by a selection unit, such as the operation unit or the like, the user selects whether to perform cleaning before a pattern is formed. Therefore, on urgent business, cleaning can be omitted, and correction may be promptly completed.

(2) In the foregoing exemplary embodiment, the amount of light from the belt is optically measured, and the contamination degree is directly determined Alternatively, according to an exemplary embodiment of the present invention, the contamination degree may be supposed from the number of rotations of the carrier. In addition, the belt may be divided into a plurality of sections, and a contamination degree about each section may be stored.

(3) In the foregoing exemplary embodiment, the cleaning device is switched on or off. However, the inventive concept of the present invention may be applied to a case where a front end of a fixed blade is in contact with the surface of the carrier, such as a belt or the like, and the carrier is constantly cleaned when being moved (not switched on or off).

(4) In the foregoing exemplary embodiment, the belt is used as the carrier on which the pattern is formed. Alternatively, according to an exemplary embodiment of the present invention, in an image forming apparatus using a transfer drum or an intermediate transfer belt, a pattern may be formed on the transfer drum or the intermediate transfer belt.

What is claimed is:

1. An image forming apparatus comprising:
   a carrier;
   a forming unit which forms an image on a carrier;
   a cleaning unit which cleans the carrier;
   a detection unit which detects a correction pattern formed on the carrier; and
   a control unit which performs correction processing including
      causing the cleaning unit to clean a pattern forming region on the carrier, wherein an operation amount of cleaning performed by the cleaning unit is changeable,
      causing the forming unit to form the correction pattern in the pattern forming region after the cleaning unit has finished cleaning, and
      correcting an image forming characteristic of the forming unit based on a detection result of the correction pattern detected by the detection unit,
   wherein, during correction processing, the control unit is capable of performing a position shift correction for correcting a position shift of an image to be formed by the forming unit and a density correction for correcting a density of an image to be formed by the forming unit, and
   wherein the cleaning unit sets an operation amount of cleaning when the density correction is performed by the control unit to be larger than an operation amount of cleaning when the position shift correction is performed.

2. The image forming apparatus according to claim 1, further comprising a selection unit which selects whether the cleaning unit performs cleaning before the control unit causes the forming unit to form the correction pattern.

3. The image forming apparatus according to claim 1, further comprising a determination unit which determines a degree of contamination of the carrier,
   wherein the cleaning unit sets the operation amount of cleaning larger as the degree of contamination of the carrier increases.

4. The image forming apparatus according to claim 3, further comprising a measurement unit which measures an amount of reflected light from the carrier,
   wherein the determination unit determines the degree of contamination of the carrier on the basis of a measurement result of the measurement unit.

5. The image forming apparatus according to claim 4,
   wherein the carrier is rotatable in a rotating direction,
   wherein the cleaning unit is arranged downstream of the measurement unit around the carrier in the rotating direction,
   wherein an image forming position of the forming unit is arranged downstream of the cleaning unit around the carrier in the rotating direction, and
   wherein the determination unit determines the degree of contamination of the carrier by subtracting an amount to be cleaned by the cleaning unit from the measurement result of the measurement unit.

6. The image forming apparatus according to claim 3,
   wherein, when the determination unit determines that the degree of contamination of the carrier is less than a reference, the cleaning unit sets the operation amount to zero.

7. The image forming apparatus according to claim 1,
   wherein, when the control unit performs a position shift correction to correct a position shift of an image to be formed by the forming unit, the detection unit detects the position of the correction pattern by comparing the amount of reflected light from the carrier with a threshold value for position detection, and
   wherein the control unit changes the threshold value for position detection according to the amount of reflected light from a surface of the carrier.

8. The image forming apparatus according to claim 1,
   wherein the cleaning unit has an operable state of cleaning the carrier and an inoperable state of not cleaning the carrier.

9. An image forming apparatus comprising:
   a carrier;
   a forming unit which forms an image on a carrier;
   a cleaning unit which cleans the carrier;
   a detection unit which detects a correction pattern formed on the carrier;
   a control unit which performs correction processing including
      causing the cleaning unit to clean a pattern forming region on the carrier, wherein an operation amount of cleaning performed by the cleaning unit is changeable,
      causing the forming unit to form the correction pattern in the pattern forming region after the cleaning unit has finished cleaning, and
      correcting an image forming characteristic of the forming unit based on a detection result of the correction pattern detected by the detection unit;
   a determination unit which determines a degree of contamination of the carrier; and
   a measurement unit which measures an amount of reflected light from the carrier,
   wherein the cleaning unit sets the operation amount of cleaning larger as the degree of contamination of the carrier increases, and
   wherein the determination unit
      determines the degree of contamination of the carrier on the basis of a measurement result of the measurement unit, and sets an intermediate value between an amount of reflected light from a surface of the carrier and an amount of reflected light from the surface of the correction pattern as a threshold value, and compares a value based on the amount of light measured by the measurement unit with the threshold value to determine the degree of contamination.

10. The image forming apparatus according to claim 9, wherein, during correction processing, the control unit is capable of performing a position shift correction for correcting a position shift of an image to be formed by the forming unit and a density correction for correcting a density of an image to be formed by the image forming unit, and wherein, during correction processing, the control unit is capable of performing a position shift correction for correcting a position shift of an image to be formed by the forming unit and a density correction for correcting a density of an image to be formed by the forming unit, and wherein the cleaning unit sets an operation amount of cleaning when the density correction is performed by the control unit to be larger than an operation amount of cleaning when the position shift correction is performed.

11. An image forming apparatus comprising:
a carrier;
a forming unit which forms an image on a carrier;
a cleaning unit which cleans the carrier;
a detection unit which detects a correction pattern formed on the carrier;
a control unit which performs correction processing including
causing the cleaning unit to clean a pattern forming region on the carrier, wherein an operation amount of cleaning performed by the cleaning unit is changeable,
causing the forming unit to form the correction pattern in the pattern forming region after the cleaning unit has finished cleaning, and
correcting an image forming characteristic of the forming unit based on a detection result of the correction pattern detected by the detection unit;
a determination unit which determines a degree of contamination of the carrier;
a measurement unit which measures an amount of reflected light from the carrier; and
a storage unit,
wherein the cleaning unit sets the operation amount of cleaning larger as the degree of contamination of the carrier increases,
wherein the determination unit determines the degree of contamination of the carrier on the basis of a measurement result of the measurement unit, and
wherein the measurement unit measures the amount of reflected light from the carrier at a predetermined interval to obtain measurement values,
wherein the storage unit stores contamination information based on measurement values obtained by the measurement unit, and wherein when the correction processing is performed, the determination unit determines the degree of contamination on the basis of the contamination information previously stored in the storage unit.

12. The image forming apparatus according to claim 11, further comprising:
a state detection unit which detects a change in state of the image forming apparatus; and
an invalidation unit which, when a change in state of the image forming apparatus is detected by the state detection unit, invalidates the contamination information.

13. The image forming apparatus according to claim 12, further comprising:
a cover which covers an opening through which the image forming unit is removable; and
a conveying unit which conveys a recording medium onto which the image on the carrier is transferred,
wherein the state detection unit detects a change in a state of the cover or a state of the conveying unit.

14. An image forming apparatus comprising:
a carrier that is rotatable in a rotating direction;
a forming unit which forms an image on a carrier;
a cleaning unit which cleans the carrier, wherein an image forming position of the forming unit is arranged downstream of the cleaning unit around the carrier in the rotating direction;
a detection unit which detects a correction pattern formed on the carrier; and
a control unit which performs correction processing including
causing the cleaning unit to clean a pattern forming region on the carrier, causing the forming unit to form the correction pattern in the pattern forming region after the cleaning unit has finished cleaning, and
correcting an image forming characteristic of the forming unit based on a detection result of the correction pattern detected by the detection unit;
a measurement unit which measures an amount of reflected light from the carrier; and
a determination unit which determines a degree of contamination of the carrier on the basis of a measurement result of the measurement unit,
wherein the cleaning unit sets an operation amount of cleaning larger as the degree of contamination of the carrier increases, and
wherein the cleaning unit is arranged downstream of the measurement unit around the carrier in the rotating direction.

15. The image forming apparatus according to claim 14, wherein an operation amount of cleaning performed by the cleaning unit is changeable.

16. The image forming apparatus according to claim 14, wherein the determination unit determines the degree of contamination of the carrier by subtracting an amount to be cleaned by the cleaning unit from the measurement result of the measurement unit.

* * * * *